US006223935B1

(12) United States Patent
Guindulain Vidondo

(10) Patent No.: US 6,223,935 B1
(45) Date of Patent: May 1, 2001

(54) SELF-POSITIONED DEVICE FOR HOLDING PRODUCTS IN DISPENSING MACHINES

(75) Inventor: Félix Guindulain Vidondo, Peralta (ES)

(73) Assignee: Jofemar, S.A., Navarra (ES)

( * ) Notice: Subject to any disclaimer, the term of this patent is extended or adjusted under 35 U.S.C. 154(b) by 0 days.

(21) Appl. No.: 09/230,161

(22) PCT Filed: Apr. 17, 1998

(86) PCT No.: PCT/ES98/00099

§ 371 Date: Jan. 20, 1999

§ 102(e) Date: Jan. 20, 1999

(87) PCT Pub. No.: WO98/53433

PCT Pub. Date: Nov. 26, 1998

(30) Foreign Application Priority Data

May 21, 1997 (ES) .................................................. 9701088

(51) Int. Cl.[7] ..................................................... B65G 59/00

(52) U.S. Cl. ....................................... 221/281; 221/312 B

(58) Field of Search ............................ 221/312 R, 312 B, 221/312 C, 281, 195, 194, 131, 124; 312/42, 35; 211/49.1, 59.2, 59.4

(56) References Cited

U.S. PATENT DOCUMENTS 3,283,954 * 11/1966 Spooner ........................... 221/281 X
4,133,421 * 1/1979 Hanley et al. ............... 221/312 R X
4,654,513 * 3/1987 Hennessy ......................... 221/194 X

FOREIGN PATENT DOCUMENTS

1139316 * 11/1962 (DE) .................................... 221/281
589344 * 4/1993 (JP) ..................................... 221/281

* cited by examiner

*Primary Examiner*—David H. Bollinger
(74) *Attorney, Agent, or Firm*—Klauber & Jackson

(57) ABSTRACT

Self-positionable device for holding products in dispensing machines, particularly cigarette packets, said machines being operated by inserting coins and having series of compartments adjacent to each other and wherein are piled the various trademarks of cigarettes, the self-positioned device comprising essentially a rod (1) which, in its operational position, is arranged in relation to the open face of the corresponding compartment (2) said rod being housed with some play into a housing (3) while it is biased by a spring (4) at its upper end towards its operational position.

3 Claims, 1 Drawing Sheet

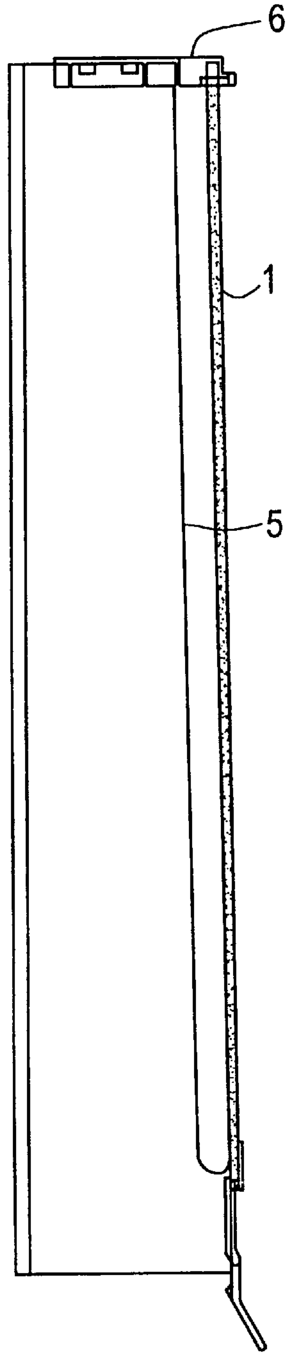
FIG. 1
FIG. 2
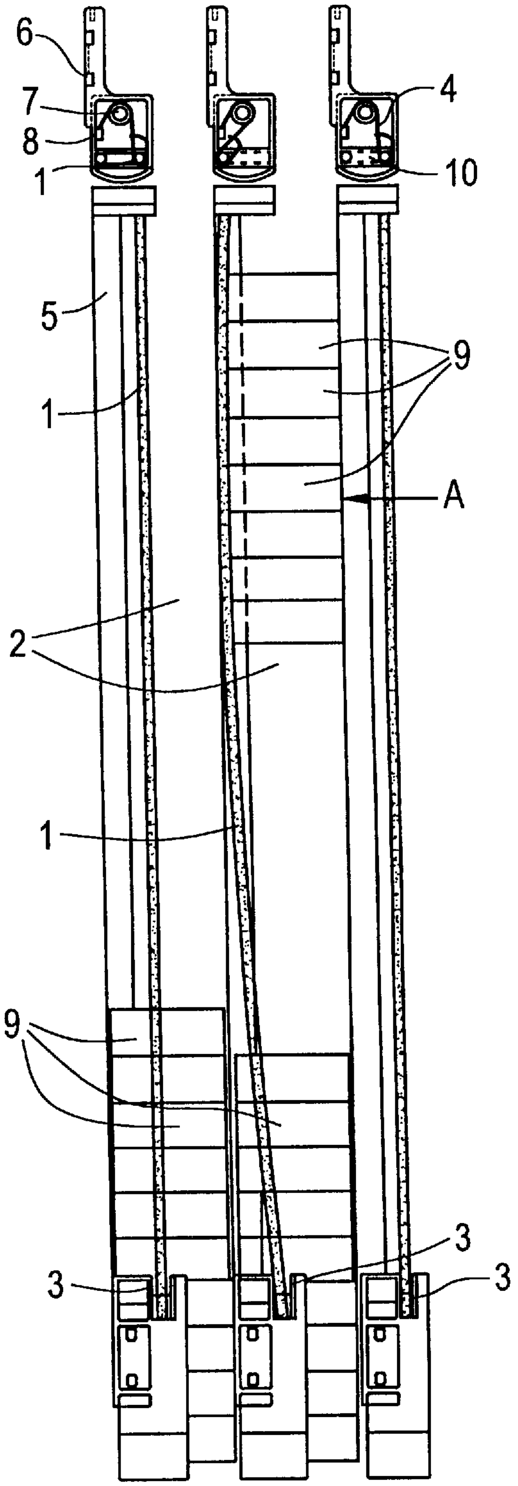

SELF-POSITIONED DEVICE FOR HOLDING PRODUCTS IN DISPENSING MACHINES

OBJECT OF THE INVENTION

As expressed in the title of the present specification, the following invention consists of a self-positionable device for holding products in vending machines, which is conceived especially to be included in automatic cigarette pack vending machines, that are coin-operated, in such a way that the same facilitates the loading of the machine in order to be able to insert a large number of packs simultaneously and besides the fastening rod of the packs in their stacking is self-positioned once the packs have been placed in the corresponding compartment.

Hence, the self-positionable device for holding products in automatic cigarette vending machines is defined by a rod aided by a spring that impels it towards its operating position, acting as a fastening element of the packs stacked in the corresponding compartment of the machine, in such a way that whenever the rod returns by the action of the spring that impels it towards its operating position, the packs are prevented from being free and accidentally collapsing, leaving the machine unusable.

FIELD OF APPLICATION

The self-positionable device for holding products in vending machines, is especially applicable to be included in automatic cigarette pack vending machines that are coin-operated, facilitating the loading of the machine, at the same time that there is complete surety that the fastening device of the packs stacked in their corresponding compartment, is perfectly arranged in order to complete the function thereof with total reliability.

BACKGROUND OF THE INVENTION

The automatic cigarette pack vending machines that are coin-operated, have a series of aligned vertical compartments in which are stacked the different brands of cigarettes, for dispensing them whenever the user has made his choice.

Said compartments are defined by a series of vertical strips that are fastened to the corresponding structure forming the machine, defining each pair of contiguous strips, each one of the compartments.

Hence, said strips in relation to the defined open side, may have a projection that permits the fastening of the stacked packs in order to prevent the same from collapsing, in such a way that in the top part of the strip, said front projection is narrower in order to facilitate the loading of the packs. Said top narrower section is not very long, and therefore, the loading being progressively carried out through said top end permits the insertion of a small number of packs simultaneously, until the compartment is complete, said operation requiring quite a bit of time.

Likewise, on the market there is a second device used to fasten cigarette packs stacked in the corresponding compartments, in such a way that in this case, the strips that define the compartments are totally flat and the device is defined by a rod provided in both ends of the respective L-shaped projections through whose vertical free wing is fit in the respective holes, acting as rotation shafts of the rod, as the same can be arranged according to two differentiated positions.

Thus, the rod is aided by the action of a top spring that impels it towards the bottom part, in such a way that at the bottom the structure of the compartment has a front projection that allows positioning of the rod in the opening position and in the operating position, said positions being delimited by the bottom projection, upon which the rod accedes upon pushing it at the top overcoming the force of the corresponding spring.

In the operating position, the rod remains in relation to the front open side of the compartment, acting as a stop of the packs stacked in it, and preventing the collapsing of the same.

In this way, upon producing the opening of the rod for the purpose of loading the machine, the loading space is defined according to its entire height, but this device has the inconvenience that if when finishing the loading some rod is not in its operating position, the packs corresponding to that compartment may collapse very easily, leaving the machine unusable, with the inconvenience that this implies.

DESCRIPTION OF THE INVENTION

The present specification describes a self-positionable device for holding in vending machines, the same being especially applicable in automatic cigarette pack vending machines, that are coin-operated, in such a way that in said machines are defined a series of compartments adjacent to each other in which are stacked the packs of different brands of cigarettes for the dispensing thereof, the self-positionable device for holding the packs to be dispensed being basically comprised of a rod that in its operating position, is in relation to the open surface of the corresponding compartment, which at its bottom end is inserted, with a small play in a recess, while at its top end it is aided by a spring that impels it towards its operating position, this is in relation to the free surface of the compartment so that the rod knocks against the packs in order to prevent them from collapsing.

The spring that impels the top end of the rod towards its operating position, in front of the packs that it positions, is mounted on a body in relation to a projection of the same, in such a way that one of its ends is fixedly arranged in a recess, and its other end pushes the top end of the rod towards its operating position, in such away that the position of the rod, as long as no direct action is carried out on the rod, will be in relation to the packs stacked in the corresponding compartment, perfectly carrying out its purpose.

The body above the corresponding strip of the compartment in which is located the spring that impels the top end of the rod towards its operating position, has a groove for its connection with said spring, along which slides the rod in its movement for the loading of the compartment and towards its operating position, upon releasing the same once loading has taken place, in such a way that the flexibility itself of the rod facilitates simultaneous loading of a large number of packs, which will be done simply by pushing the rod so that it moves and lets the packs pass, so that once released, by the action of the spring, it self positions itself again in its operating position.

This device, has the big advantage that it is continuously impelled towards its operating position, for which purpose as long as the same is not activated, it will be in the operating position, keeping in position the packs to be dispensed, avoiding accidental collapsing thereof.

In order to complete the description that is going to be made hereinafter, and for the purpose of providing a better understanding of the characteristics of the invention, the present specification is accompanied by a drawing, in whose figures the most characteristic details of the invention are represented in an illustrative and non-restrictive manner.

BRIEF DESCRIPTION OF THE DRAWINGS

FIG. 1 shows a side raised view of the self-positionable device for holding products stored in vending machines in which one can see the strip that forms the wall of the adjoining compartments, as well as the self-positionable rod that allows the loading of the compartments by simultaneously introducing a large number of packs.

FIG. 2 shows a front view of the self-positionable device for holding products in vending machines, which is mainly to be included in automatic cigarette pack vending machines, it being possible to see three contiguous strips that define the corresponding compartments, seeing how one of the rods has been moved with respect to its operating position, upon the loading of a large number of packs being done simultaneously, facilitating this operating, both the top movement of the rod, as well as the flexibility itself thereof. Likewise, above each strip dividing the compartments, the bodies including the top spring that impel the top end of the rod towards its operating position, have been represented.

DESCRIPTION OF A PREFERRED EMBODIMENT

In view of the commented figures and in accordance with the numbering used, we can see how the self-positionable device for holding products in vending machines, is comprised basically of a rod (1) placed laterally to the open surface of the corresponding compartments (2), which at bottom end thereof is positioned in a blind hole (3) with a little bit of play, while the top end of the rod (1) is associated to a spring (4) that impels it in its operating position, that is to say, the open surface of the corresponding compartment (2).

The different compartments (2) in which are stacked the cigarette packs (9) to be dispensed, are defined by strips (5) that are fastened to the structure itself of the machine and that with each other form the cited compartments (2), with the open front surface upon which remains the rod (1) that acts as a fastening element of the packs in order to prevent the same from accidentally collapsing.

In order to allow the rod (1) to adequately carry out its function, the same is aided at its top end by a spring (4) that impels it towards its operating position, that is to say, upon the open front surface of the corresponding compartment, and for this purpose, the top part of the strips (5) that define the compartments (2) have a body (6) in which the cited spring (4) is mounted.

In this way the cited spring (4) defined by a wound thread is mounted on a circular projection (7), with a fixed end (8), while its other end, embraces the rod (1) and being in tension, pushes it towards its operating position upon the front surface of the corresponding compartment.

The body (6) in the position of connecting the spring (4) with the rod (1), has a groove (10) for which reason the rod (1) is movable in its movement when being loaded, and for its return to the original operating position impelled by the spring (4).

With this shape upon carrying out the loading of the compartments (2) with the corresponding cigarette packs (9), it will suffice to activate the rod (1) in the direction of arrow A, so that the top end of the same moves along groove (10) at the same time that it bends, facilitating the insertion of a considerable number of packs (9) simultaneously, with the big advantage that once the packs are in the hollow space of the compartment they slide towards the bottom part and the rod (1) returns to its operating position by the action of the spring (4) being upon the open front surface of the compartment, acting as a fastening support of the stacked packs (9) in order to prevent the same from collapsing.

What is claimed is:

1. An automatic vending machine having a self-positioning device for holding products therein, said automatic vending machine comprising a plurality of compartments adjacent to each other, each of said compartments having a top, a bottom and lateral holding means adapted to contain the products in a vertically stacked manner, each of said compartments further having an open side between said lateral holding means, said self-positioning device comprising a rod having an operating position located within the open side of each compartment, said rod, when in said operating position being located before the products thereby retaining the products in a stacked manner within said compartment, said rod having a loading position wherein said rod is displaced with respect to said open side to allow the products to be loaded into said compartment, said rod having an upper end and a lower end, said compartment having a recess located at the bottom thereof and a spring located at the top thereof, said lower end of said rod being movable fitted with said recess and said upper end of said rod begin biased by said spring impelling said rod toward said operating position.

2. An automatic vending machine as defined in claim 1 wherein said spring has a first end and a second end, and wherein said compartment has a projection located at the top thereof, a portion of the spring being mounted over said projection, said first end of the spring being fixed within respect to said top of said compartment and said second end of the spring being assembled to said upper end of said rod such that the upper end of said rod is pushed toward said operating position.

3. An automatic vending machine as defined in claim 1 wherein said top of said compartment has a groove within said upper end of said rod is positioned and wherein said groove allows the upper end of said rod to move from said operating position to said loading position in which said rod allows the products to be loaded into said compartment and to return said rod to said operating position.

* * * * *